Sept. 6, 1966  L. J. MAILLOUX  3,270,598
SKIVING TOOL HOLDER
Filed July 13, 1964
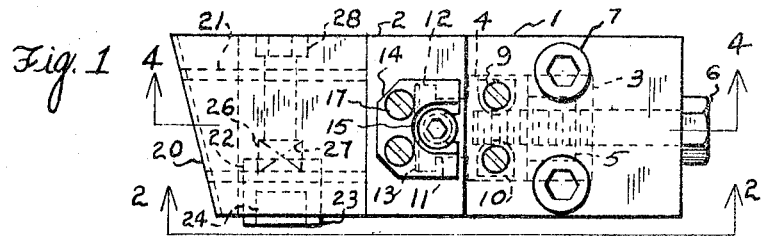
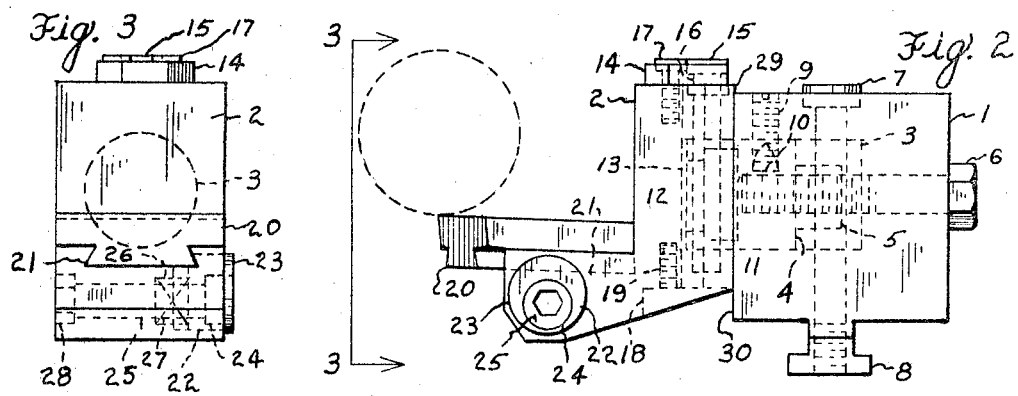
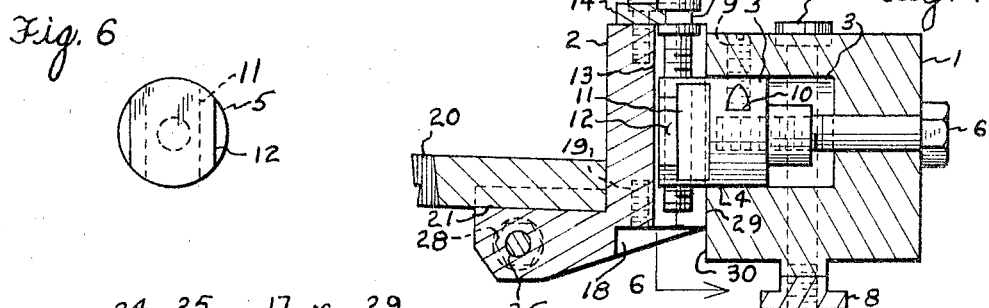
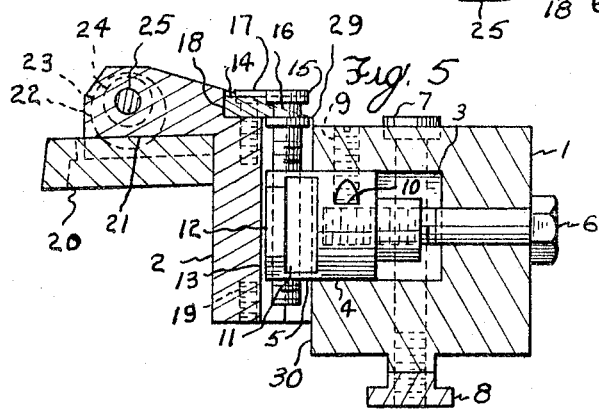
INVENTOR.
LAWRENCE J. MAILLOUX
BY
Allan J. Murray
ATTORNEY United States Patent Office 3,270,598
Patented Sept. 6, 1966

3,270,598
SKIVING TOOL HOLDER
Lawrence J. Mailloux, Detroit, Mich., assignor to Screw Machine Tool Company, Detroit, Mich.
Filed July 13, 1964, Ser. No. 382,127
3 Claims. (Cl. 82—36)

This invention relates to skiving tool holders, and particularly to such holders as are provided with a plurality of adjustments to afford greater flexibility in establishing a desired relationship of a cutting tool and a workpiece to be formed thereby, and which are designed to afford alternative inverted positions of a cutting tool.

The combination of angles on the faces converging to form the elongated cutting edge on a skiving tool results in a disposition of such tool in the usual tool holder with such cutting edge in a compound angular relation to the axis rotation of a workpiece, which would result in cutting on the workpiece surface a "taper," angular to said axis of rotation. This "taper" may be avoided by careful, meticulous grinding of the cutting tool. However, in addition to the expense, this procedure raises the problem that should the "shear angle" (the angle at which the cutting edge engages the workpiece) of the cutting edge prove unsatisfactory for a particular job, not only must the "shear angle" be reground, but such regrinding results in a different angle of the "taper," and this must be compensated for in the regrinding operation.

Further in the past, no adequate provision has been made for inverting a skiving tool in a holder, so that it may cut from either of alternative inverse positions. Too, some prior devices are so constructed that an elongated shank is extended from a body or block to compensate for wear of the cutting tool, by advancing said tool toward workpiece, and the farther such shank is extended the weaker and less compact the tool becomes.

It is an object of the present invention to provide a skiving tool holder of compact rigid assembly which does not separate its major components to compensate for wear of a cutting tool, and to provide rigid metal to metal assembly of said holder when in use.

Another object is to provide a block to mount on a tool machine and to adjustably mount a tool carrier upon said block in such a manner that the carrier and cutting tool may be applied to the block in alternative inverse positions for sliding adjustment on the block to and from a workpiece, and maintain adjustment controls in an accessible position.

Still another object is to form the block with a recess and provide a nut, removably received in said block, and to form a projecting portion of the nut as a slide whereon the tool carrier may be slidably mounted, and to provide means to effect positive rotation of the nut, with the tool carrier mounted thereon, to compensate for the aforesaid "taper" producing angle.

These and various other objects are attained by the construction hereinafter described, and illustrated in the accompanying drawings, wherein:

FIG. 1 is a plan view of my improved construction.
FIG. 2 is a side elevational view thereof on line 2—2 of FIG. 1.
FIG. 3 is a front elevational view on line 3—3 of FIG. 2.
FIG. 4 is a vertical, sectional view on line 4—4 of FIG. 1.
FIG. 5 is a vertical sectional view similar to FIG. 4, except that the tool carrier is in its inverted position.
FIG. 6 is a view on line 6—6 of FIG. 4, showing only the nut.

In these views, the reference character 1 designates a block, upon which is mounted a tool carrier 2. The block is formed with a circular recess 3 which rotatably receives an annnular portion 4 of a nut 5. A headed screw 6 extends through a portion of the block, and through said recess 3 to threadedly engage the nut. Screws 7, disposed on opposite sides of the nut, extend through the block 1 to threadedly engage T nuts 8, where the construction may be mounted on a machine tool in a conventional and well known manner.

Set screws 9 have their inner ends engaged on flats 10, formed to straddle a plane entending through the axis of rotation of the nut. Said screws may be used to vary the position of said nut about its said axis.

The forward portion of the nut projects from said recess, and is machined with notches 11 and flats 12 to form a slide. Corresponding to said slide is a slideway 13 formed in the tool carrier, as seen clearly in FIG. 1. A retaining plate 14 is mounted on the carrier 2 at one end of said slideway. An adjusting screw 15 is formed at one end with an annular groove 16, which, as seen in FIGS. 2, 4 and 5, is engaged by the retaining plate 14, to resist longitudinal movement of the screw relative to the carrier and the plate 14. The inner end portion of said screw 15 is threadedly received in the slide portion of the nut 5, so that sliding adjustment of the carrier on the slide is accomplished by rotation of the screw 15. Screws 17 removably secure the plate 14 in position.

On the bottom of the carrier is formed a recess 18 to receive the retaining plate 14. Screw holes 19 are prepared to receive the aforesaid screws 17. Thus, as seen in FIG. 5, the tool carrier may be inverted on the slide if this inverted position should be desirable. A notable feature of this arrangement is that it leaves the adjusting screw 15 in an upper position for easy access. Further, the design of the carrier 2 affords full support to the cutting tool 20 in either of said positions.

FIG. 3 clearly shows the dovetail provision 21 on the carrier for firmly securing the cutting tool 20. Removability of the tool is afforded by provision of a plug 23 inwardly conforming to said dovetail, and received in a hole 23 a screw 25 extends through the carrier, and occupies an eccentric position through said plug 23. A spring chamber 26 houses a spring 27, which reacts against said plug to urge it outwardly when the screw 25 is turned to withdraw from the carrier and disengage from a nut 18 on its threaded end.

It is observed that the described device is compact and sturdy. The two largest components, the block and the carrier, are drawn into rigid engagement by turning the screw 6, so that the nut is drawn inwardly of the recess 3. Obviously, the arrangement of the slide with the slideway 13 draws the carrier toward the block into said rigid engagement. This relationship affords almost solid metal to metal contact, with a consequent lateral stability, which is highly desirable as the forces acting on the cutting edge of the tool impart a lateral stress through the construction.

The sliding adjustment affords considerable latitude in the diameter of the workpieces formed with the tool. Further, the use of the set screws 9 to affect the position of the nut about its axis of rotation contribute greatly, as aforesaid, to a more economical and speedy set up of the tool. It is believed clear that the screw 6 must be turned to relax the aforesaid rigid engagement of the carrier 2 and block 1 in order to make the desired sliding and rotational adjustments. It is observed that plane faces 29, 30 on the carrier and block respectively, afford a substantially uniform and extensive metal to metal engagement of said elements.

What I claim is:
1. A tool holder including,

(a) a block to mount a tool carrier, and adapted to mount upon a tool machine, said block having at least one plane face, and being formed with (b) a recess opening in said face, (c) a nut having a portion rotatably received in said recess, and having a portion protruding from the recess, (d) a slide formed on said protruding portion (e) a tool carrier mounting a cutting tool and having at least one plane face, and being formed with (f) an elongated slideway, extending along said face and recessed therein to slidably interlock with said slide (d) and mount the carrier thereon, said slideway being open at each end thereof, (g) locking means interengaging the nut and the block, and actuable to draw said nut inwardly of said recess, and thus draw said carrier into rigid metal-to-metal engagement with said block, abutting said plane faces, said locking means being actuable to release said elements from said rigid engagement to afford sliding travel of the carrier on said slide, and rotative actuation of said nut in said recess, (h) a screw extending into and along said slideway, and threadedly engaging said slide (d)

(i) restraining means removably secured to said carrier, to engage an end portion of said screw (h) and resist movement of said screw along its longitudinal axis relative to said carrier, whereby rotation of said screw effects travel of said screw through said nut, and travel of said carrier on said slide to dispose said carrier to position a cutting tool in desired relation to a workpiece, (j) means carried by said block and actuable to effect said rotation of said nut (c) and associated carrier to dispose a cutting edge of said tool in a desired relation to the axis of rotation of a workpiece.

2. A tool holder as set forth in claim 1, said restraining means (i) being adapted to be removably secured at either end of said slideway, and said carrier being adapted to alternatively mount said restraining means, whereby said carrier may be mounted in alternative, inverse positions on said slide (d).

3. A tool holder as set forth in claim 2, said locking means (g) being a headed screw extending through said block and into said recess, to threadedly engage said nut and rotatable to draw said nut into said recess, and effect said rigid engagement, or to release said carrier and block from said rigid engagement.

References Cited by the Examiner

UNITED STATES PATENTS 3,063,318   11/1962   Schlappal _____ 82—36

WILLIAM W. DYER, Jr., *Primary Examiner.*

LEONIDAS VLACHOS, *Examiner.*